(12) United States Patent
Turner et al.

(10) Patent No.: US 7,073,622 B2
(45) Date of Patent: Jul. 11, 2006

(54) ON AND OFF ROAD STEERING RATIOS

(75) Inventors: Marcus Turner, Coventry (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 10/868,020

(22) Filed: Jun. 15, 2004

(65) Prior Publication Data
US 2005/0274567 A1 Dec. 15, 2005

(51) Int. Cl.
*B60K 17/354* (2006.01)

(52) U.S. Cl. .......................................... 180/446; 701/41
(58) Field of Classification Search ................ 180/446, 180/444; 701/41
See application file for complete search history.

(56) References Cited

U.S. PATENT DOCUMENTS

| 4,733,878 | A | * | 3/1988 | Kanazawa et al. | .......... | 180/415 |
| 4,739,855 | A | * | 4/1988 | Miyoshi et al. | ............. | 180/422 |
| 4,913,250 | A |   | 4/1990 | Emori et al. | | |
| 5,181,173 | A | * | 1/1993 | Avitan | ......................... | 701/42 |
| 5,225,983 | A |   | 7/1993 | Ohmura et al. | | |
| 5,423,391 | A | * | 6/1995 | Shimizu | ..................... | 180/446 |
| 5,964,814 | A |   | 10/1999 | Muller et al. | | |
| 6,012,540 | A |   | 1/2000 | Bohner et al. | | |
| 6,041,887 | A | * | 3/2000 | Kojo et al. | .................. | 180/446 |
| 6,155,377 | A |   | 12/2000 | Tokunaga et al. | | |
| 6,173,221 | B1 |   | 1/2001 | Boehringen et al. | | |
| 6,302,441 | B1 | * | 10/2001 | Kawamuro et al. | ......... | 280/771 |
| 6,655,494 | B1 | * | 12/2003 | Menjak et al. | ............... | 180/446 |

FOREIGN PATENT DOCUMENTS

| EP | 0870671 | 10/1998 |
| JP | 11099956 | 4/1999 |
| WO | 03024764 | 3/2003 |
| WO | 2005028283 | 3/2005 |

* cited by examiner

*Primary Examiner*—Tony Winner
(74) *Attorney, Agent, or Firm*—Price, Heneveld, Cooper, Dewitt & Litton, LLP.

(57) ABSTRACT

A steering system (10) for a motor vehicle comprising a steerable wheel (12) defining a steering angle (20), a powered actuator (14) controlling the steering angle (20) and a steering wheel (16) providing a driver input control angle. The ratio of the driver input control angle to the steering angle (20) defines a steering ratio. The steering system (10) also includes a controller (18) selectively varying the steering ratio based, at least in part, upon road conditions.

18 Claims, 2 Drawing Sheets

ON AND OFF ROAD STEERING RATIOS

BACKGROUND OF THE INVENTION

The present invention relates to a motor vehicle, and in particular to an active front steering system for a motor vehicle.

Active front steering systems for motor vehicles are used to rotate the wheels of the vehicle at a different rate than the rotation of the steering wheel of the vehicle or without rotation of the steering wheel. The ratio of the rotation of the steering wheel to the rotation of the wheel defines a steering ratio. The active front steering system therefore sets the steering ratio of the vehicle. Without the active front steering system, the steering ratio is typically only determined by the ratio set by the mechanical connections between the steering wheel and the wheel of the vehicle.

Heretofore, active front steering systems have included a powered actuator operably connected to a rack of a rack-and-pinion system of a vehicle. The active front steering system assists in pivoting the steerable wheels. In basic operation, the active front steering system typically augments a driver input control angle from the driver as applied to the steering wheel, via the powered actuator, to rotate the wheels according to the steering ratio.

SUMMARY OF THE INVENTION

One aspect of the present invention is to provide a steering system for a motor vehicle comprising a steerable wheel defining a steering angle, a powered actuator controlling the steering angle and a steering wheel providing a driver input control angle. The ratio of the driver input control angle to the steering angle defines a steering ratio. The steering system also includes a controller selectively varying the steering ratio based, at least in part, upon road conditions.

Another aspect of the present invention is to provide a steering system for a motor vehicle comprising a steerable wheel defining a steering angle, a powered actuator controlling the steering angle and a steering wheel providing a driver input control angle. The ratio of the driver input control angle to the steering angle defines a steering ratio. The steering system also includes at least one sensor detecting at least one operating parameter of the vehicle and a controller operatively connected to the powered actuator and receiving a signal from the at least one sensor. The controller determines if an off road condition is present based, at least in part, upon the at least one operating parameter, and selectively changes the steering ratio if the off road condition is present.

Yet another aspect of the present invention is to provide a method for selectively varying a steering ratio of a motor vehicle having a steerable wheel defining a steering angle and a steering wheel providing a driver input control angle, with the ratio of the driver input control angle to the steering angle defining the steering ratio. The method comprising the steps of determining what road conditions are present and varying the steering ratio in response to the road conditions.

Accordingly, the steering system of the vehicle will automatically select a steering ratio that will best fit the driving conditions of the vehicle. The vehicle steering system is easy to implement, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
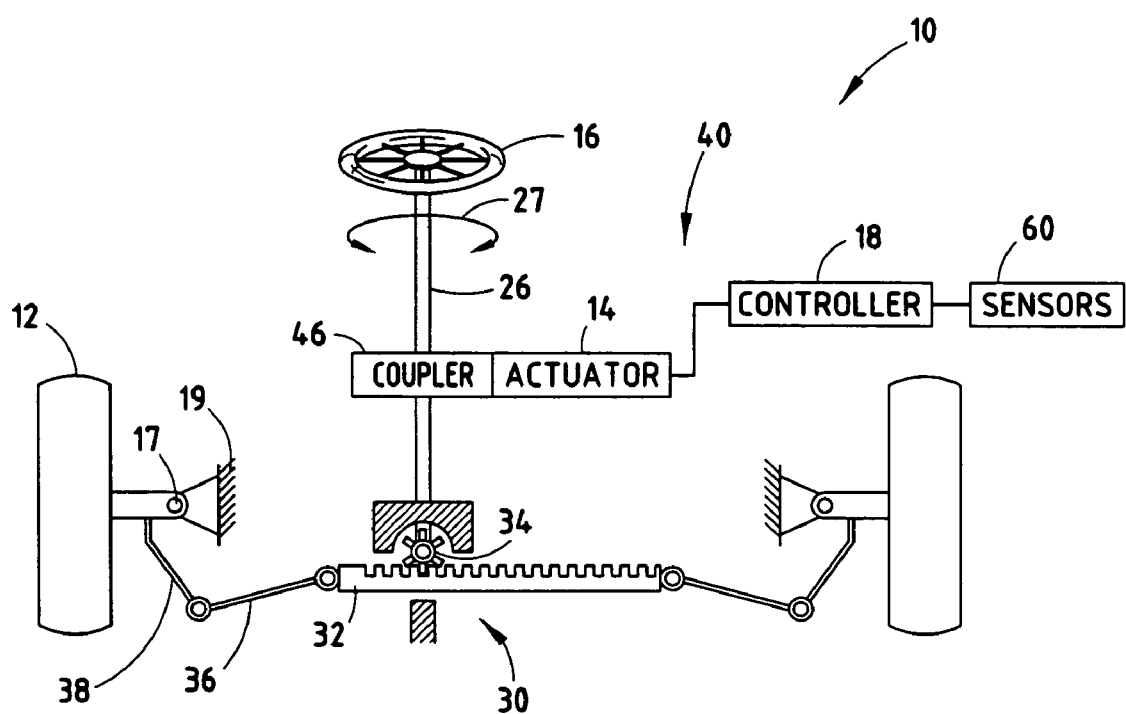
FIG. 1 is a partially schematic view of a steering system embodying the present invention, wherein a steering angle is 0°.
Figure 2:
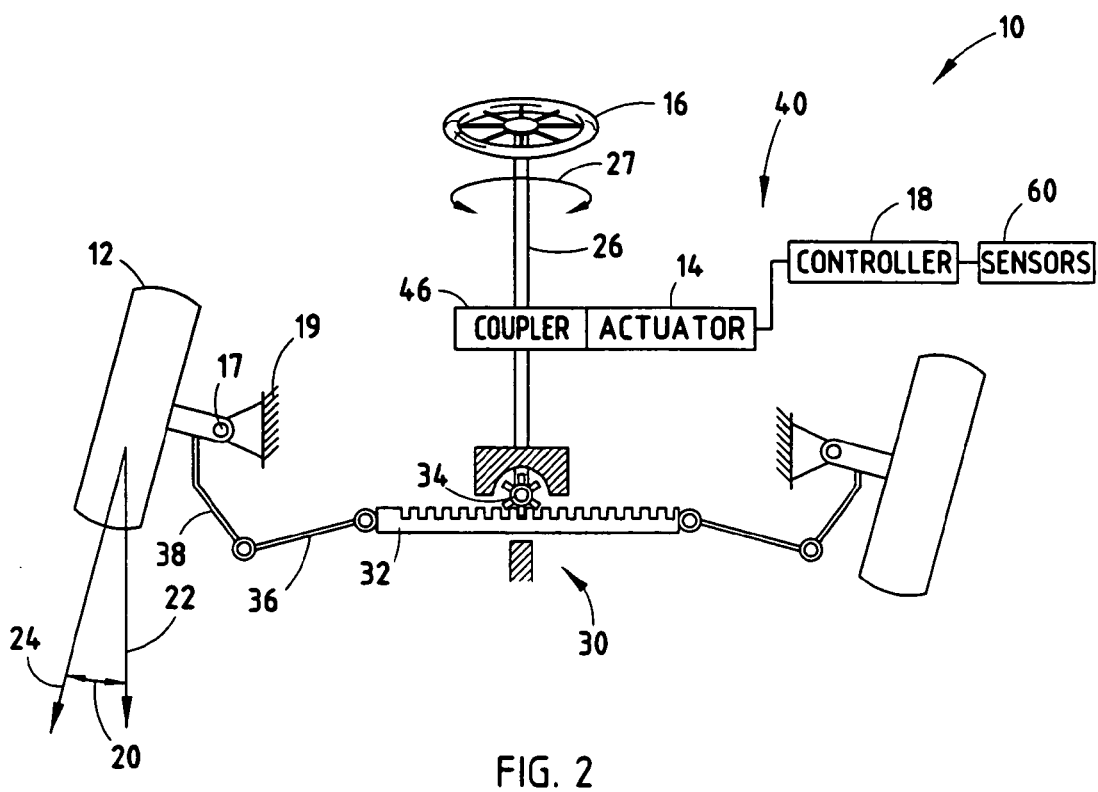
FIG. 2 is a partial schematic view of the steering system pivoted to a non-zero steering angle.

Referring to FIG. 1, reference number 10 generally designates a steering system for a motor vehicle embodying the present invention. In the illustrated example, the steering system 10 comprises a steerable wheel 12 defining a steering angle 20 (see FIG. 2), a powered actuator 14 controlling the steering angle and a steering wheel 16 providing a driver input control angle. The ratio of the driver input control angle to the steering angle defines a steering ratio. The steering system 10 also includes a controller 18 for selectively varying the steering ratio based, at least in part, upon road conditions.

In the illustrated example, the steering system 10 includes a pair of the steerable wheels 12 that pivot about a pivot point 17 with respect to a vehicle frame 19. Each wheel defines the steering angle 20 (FIG. 2) between the longitudinal axis 22 of the associated vehicle and a central travel axis 24 of each wheel 12. It should be noted that while the steering angle 20 is defined by the pivotal movement of each of steerable wheels 12, the steering angle 20 may be defined by pivotable rear wheels if the vehicle is so equipped, and/or any other pivotable wheels.

The illustrated steering system 10 also includes a steering column 26 rotatable in a direction represented by an arrow 27, and operable to receive the driver input control angle from an operator of the vehicle via the steering wheel 16. The steering column 26 is operably linked to the steerable wheels 12 via a rack-and-pinion system 30 that includes a rack 32 and a pinion gear 34, a pair of drag links 36, and a steering arm 38. Although the present example utilizes a rack-and-pinion steering system, it should be noted that other steering systems compatible with the steering system 10 described herein may be utilized.

The steering system 10 further includes a basic active front steering system 40 that includes the controller 18 in operable communication with the powered actuator 14. The powered actuator 14 is operably connected to the rack 32 of the rack-and-pinion system 30 via a coupler 46. The active front steering system 40 assists in pivoting the steerable wheels 12. Although a particular kind of active front steering system is described herein, other systems known in the art my be utilized. In basic operation, the active front steering system 40 augments the driver input control angle from the driver as applied to the steering wheel 16, via the powered actuator 14. The steering angle 20 as defined by the steerable wheel 14 is determined by a combination of the driver input control angle and an additional steering angle supplied by the powered actuator 14. The additional steering angle supplied by the powered actuator 14 is determined by the following equation:

$$\alpha_{ASA} = \delta_{DICA}((R_A - R_D)/R_D);$$

wherein $\alpha_{ASA}$=the additional steering angle supplied by the powered actuator 14, $\delta_{DICA}$=the angle change of the steering wheel 16 as determined by the driver input steering angle, $R_A$=the steering ratio of the vehicle without the additional steering angle and $R_D$=the desired steering ratio. For example, if the steering ratio of the steering system 10 without the powered actuator 14 is 1 (e.g., turn the steering wheel 16 five degrees and the steerable wheel 12 will turn five degrees), the desired steering ratio is 5 (i.e., slow change of the steering angle 20 of the steerable wheel 12 compared to the change of angle of the steering wheel 16) and the steering wheel 16 has moved five degrees, the powered actuator 14 will move the steerable wheel 12 negative four degrees. Therefore, the steering wheel 16 will rotate five degrees and the steerable wheel 12 will rotate one degree, thereby providing the vehicle with a steering ratio of 5.

Figure 3:
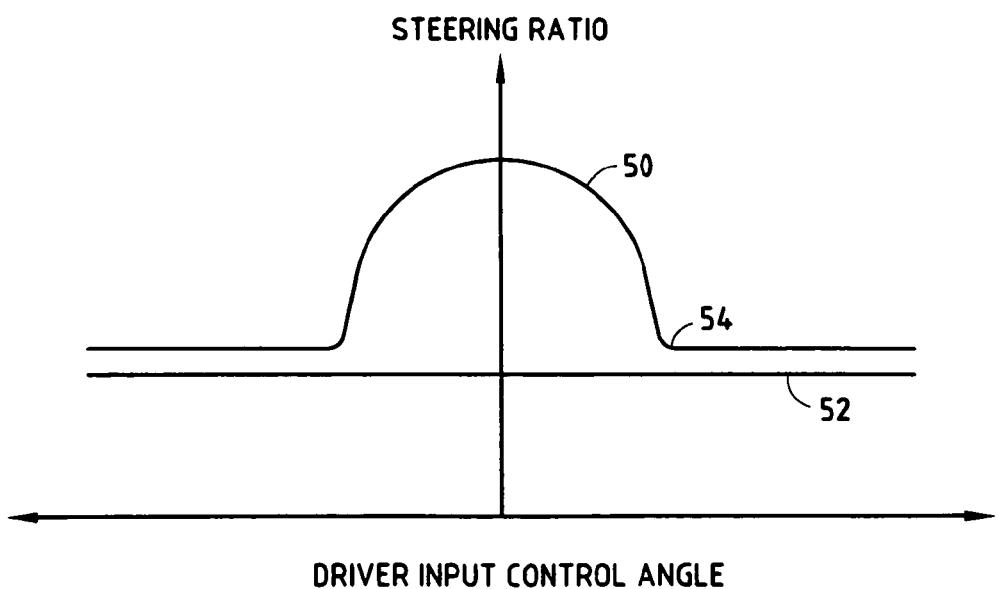
FIG. 3 is a diagram of steering ratio versus driver input control angle of a steering wheel for the present inventive steering system.

In the illustrated example, the controller 18 of the active front steering system 40 will selectively vary the steering ratio based, at least in part, upon road conditions. FIG. 3 illustrates a first steering ratio graph 50 for on road driving and a second steering ratio graph 52 for off road driving on a chart showing the steering ratios for the first steering ratio graph 50 and the second steering ratio graph 52 as a function of the driver input control angle as inputted on the steering wheel 16 from the driver. The controller 18 will command the powered actuator 14 to provide for a steering angle as determined by the steering ratio of the first steering ratio graph 50 when the vehicle is on road and the steering ratio of the second steering ratio graph 52 when the vehicle is off road.

The illustrated first steering ratio graph 50 for on road driving is variable, varies with the driver input control angle and has a maximum when the driver input control angle is zero. Therefore, when the driver input control angle is a small value (i.e., the steering wheel 18 is rotated a small angle by the driver), the steering angle 20 will be smaller than the driver input control angle. Starting from a zero position (i.e., when the steering wheel 18 is not rotated and the driver input control angle is zero) and rotating the steering wheel 18, the steering angle 20 will move very slowly at first and will begin to increase as the steering ratio lowers. Once the driver input control angle reaches point 54, the steering ratio will no longer vary and the steering angle 20 will change as the driver input control angle changes in a linear fashion. The steering angle 20 will preferably move slowly in response to the driver input control angle when the steering wheel 16 is close to the zero position because the vehicle it typically travelling fast when the steering angle 20 of the steerable wheels 12 is close to zero to give the driver better control of the vehicle. Additionally, when the steering angle 20 is high, the driver is usually carrying out a low speed maneuver such as parking and the driver does not want to have to turn the steering wheel 18 too far. Therefore, at the point 54, the steering ratio will become linear.

In the illustrated example, the second steering ratio graph 52 for off road driving is linear. Therefore, when the vehicle is off road driving, the driver of the vehicle will have fine control of the steering angle 20 in order to have the vehicle and the steering angle 20 react quickly to the driver input control angle.

In the preferred embodiment, the controller 18 communicates with a sensor 60 detecting an operating parameter of the vehicle to determine if an off road condition is present based upon the operating parameter. The controller 18 may include a general-purpose microprocessor-based controller, and may include a commercially available off-the-shelf controller. The controller 18 preferably includes a processor and memory for storing and processing software algorithms which processes inputs from the sensor 60 and provides output control signals to the powered actuator 14. If the controller 18 determines if an off road condition is present, the controller 18 varies the steering ratio by moving from the first steering ratio graph 50 to the second steering ratio graph 52.

The following are examples of operating parameters readable by the sensor 60 and the determination made by the controller 18 to determine that the off road condition is present. First, the sensor 60 could read a steerable wheel to road friction at high temperatures, with a low ratio indicating that the vehicle is in the off road condition. Second, the sensor 60 could read a vertical acceleration of the vehicle in combination with a speed of the vehicle, with a large vertical acceleration of the vehicle at low speeds indicating that the vehicle is in the off road condition. Third, the sensor 60 could read a condition of differential locks, with an engagement of the differential locks indicating that the vehicle is in the off road condition. Fourth, the sensor 60 could read a condition of a low ratio gear box, with engagement of the low ratio gear box indicating that the vehicle is in the off road condition. Fifth, the sensor 60 could read a frequency of a load on the steerable wheels, with a dynamic low frequency indicating that the vehicle is in the off road condition. Sixth, the sensor 60 could read deflections of an anti-roll bar, with large deflections indicating that the vehicle is in the off road condition. Seventh, the sensor 60 could receive global positioning satellite (GPS) signals, with the GPS signals indicating that the vehicle is in the off road condition. Eighth, the sensor 60 could read a position of a dial in the vehicle selected by the driver, with the position of the dial indicating that the vehicle is in the off road condition. Finally, the sensor 60 could read a difference in a height of the steerable wheels 12, with a height below a certain level indicating an on road condition because the vehicle could only be on a curb, but a number of large wheel travels indicating that the vehicle is in the off road condition. Although only one operating parameter reading can be used to determine the condition of the vehicle, more than one operating parameter could be measured by the sensor 60 or multiple sensors 60 to determine the condition of the vehicle. The sensors, measurements taken by the sensors and the determinations by the controller 18 listed above are described for illustrative purposes only and not meant to limit the sensor and sensor reading available in the system of the present invention. The controller 18 would also be able to determine that the off-road condition is not present using the same readings as discussed above. The controller 18 would therefore determine that an on road condition is present. The controller 18 would then select the first steering ratio graph 50.

Although only a first steering ratio graph 50 and a second steering ratio graph 52 are illustrated herein, it is contemplated that the controller 18 could vary the steering ratio between a plurality of graphs. It is contemplated that the controller 18 could have one steering ratio graph for on road driving and a plurality of steering ratio graphs for off road driving. Each of the steering graphs for off road driving could be individualized for a different off road driving condition. For example, the controller 18 could change the steering ratio graph to a first off road steering graph for driving on sand, a second off road steering ratio graph for driving on dirt, a third off road steering ratio graph for driving in mud, a fourth off road steering ratio graph for driving up and down hills, etc. Furthermore, it is contemplated that the controller 18 could have a plurality of steering ratio graphs for on road driving depending on the speed of the vehicle. Additionally, although the off road steering angle of the second steering ratio graph 52 is shown as being linear, it is contemplated that the second steering ratio graph 52 could be non-linear and/or the first steering ratio graph 50 could be linear.

It will be readily appreciated by those skilled in the art that modifications may be made to the invention without departing from the concepts disclosed herein. For example, although the steering system is disclosed as including a direct mechanical connection between the steering wheel 16 and the steerable wheels 12, it is contemplated that the steering system and method of selectively varying the steering ratio as disclosed herein could be used with a drive by wire system. Drive by wire systems are known to those skilled in the art. Such modifications are to be considered as included in the following claims, unless these claims by their language expressly state otherwise.

We claim:

1. A steering system for a motor vehicle, comprising:
a steerable wheel defining a steering angle;
a powered actuator controlling the steering angle;
a steering wheel providing a driver input control angle, the ratio of the driver input control angle to the steering angle defining a steering ratio; and
a controller selectively varying the steering ratio based, at least in part, upon road conditions;
wherein the controller provides an on road steering ratio and an off road steering ratio, the on and off road steering ratios being a function of the driver input control angle, the on road steering ratio varying as a function of the driver input control angle in a manner that is different than that of the off road steering ratio.

2. A steering system for a motor vehicle, comprising:
a steerable wheel defining a steering angle;
a powered actuator controlling the steering angle;
a steering wheel providing a driver input control angle, the ratio of the driver input control angle to the steering angle defining a steering ratio; and
a controller selectively varying the steering ratio based, at least in part, upon road conditions;
wherein the controller determines if an on road condition is present and selects an on road steering ratio if the on road condition is present or an off road steering ratio if the on road condition is not present.

3. The steering system set forth in claim 2, wherein:
the on road steering ratio is variable;
the on road steering ratio varies with the driver input control angle; and
the on road steering ratio has a maximum when the driver input control angle is zero.

4. The steering system set forth in claim 3, wherein:
the off road steering ratio is constant.

5. A steering system for a motor vehicle, comprising:
a steerable wheel defining a steering angle;
a powered actuator controlling the steering angle;
a steering wheel providing a driver input control angle, the ratio of the driver input control angle to the steering angle defining a steering ratio; and
a controller selectively varying the steering ratio based, at least in part, upon road conditions;
wherein the controller determines if an on road condition is present and provides an on road steering ratio that varies with the driver input control angle if the on road condition is present, the on road steering ratio having a maximum when the driver input control angle is zero.

6. The steering system set forth in claim 5, wherein:
the controller determines if an off road condition is present and provides an off road steering ratio that varies less with the driver input control angle than the on road steering ratio if the off road condition is present.

7. A steering system for a motor vehicle, comprising:
a steerable wheel defining a steering angle;
a powered actuator controlling the steering angle;
a steering wheel providing a driver input control angle, the ratio of the driver input control angle to the steering angle defining a steering ratio;
at least one sensor detecting at least one operating parameter of the vehicle;
a controller operatively connected to the powered actuator and receiving a signal from the at least one sensor, the controller determining if an off road condition is present based, at least in part, upon the at least one operating parameter, and selectively changing the steering ratio if the off road condition is present.

8. The steering system set forth in claim 7, wherein:
the controller selects the off road steering ratio if the off road condition is present or an on road steering ratio if the off road condition is not present.

9. The steering system set forth in claim 8, wherein:
the on road steering ratio is variable;
the on road steering ratio varies with the driver input control angle; and
the on road steering ratio has a maximum when the driver input control angle is zero.

10. The steering system set forth in claim 9, wherein:
the off road steering ratio is constant.

11. The steering system set forth in claim 7, wherein:
the controller provides an on road steering ratio that varies with the driver input control angle if the off road condition is not present, the on road steering ratio having a maximum when the driver input control angle is zero.

12. The steering system set forth in claim 11, wherein:
the off road steering ratio varies less with the driver input control angle than the on road steering ratio if the off road condition is present.

13. The steering system set forth in claim 7, wherein:
the controller provides an on road steering ratio and the off road steering ratio, the on and off road steering ratios being a function of the driver input control angle, the on road steering ratio varying as a function of the driver input control angle in a manner that is different than that of the off road steering ratio.

14. A method for selectively varying a steering ratio of a motor vehicle having a steerable wheel defining a steering angle and a steering wheel providing a driver input control angle, the ratio of the driver input control angle to the steering angle defining the steering ratio, comprising the steps of:
determining what road conditions are present; and varying the steering ratio in response to the road conditions;

wherein the step of varying the steering ratio comprises:

varying the steering ratio between an on road steering ratio and an off road steering ratio, the on road steering ratio varying as a function of the driver input control angle in a manner that is different than that of the off road steering ratio.

15. The method set forth in claim 14, wherein:

the on road steering ratio has a maximum when the driver input control angle is zero.

16. A method for selectively varying a steering ratio of a motor vehicle having a steerable wheel defining a steering angle and a steering wheel providing a driver input control angle, the ratio of the driver input control angle to the steering angle defining the steering ratio, comprising the steps of:

determining what road conditions are present; and varying the steering ratio in response to the road conditions;

wherein the step of varying the steering ratio comprises:

setting the steering ratio to a higher value when the vehicle is on road than when the vehicle is off road.

17. The method set forth in claim 16, wherein:

the steering ratio is a function of the steering angle when an off road condition is present, the steering ratio being greatest when the steering angle is zero.

18. The method set fort in claim 17, wherein:

the off road steering ratio is constant.

* * * * *